United States Patent
Byeon et al.

(10) Patent No.: US 11,727,703 B2
(45) Date of Patent: Aug. 15, 2023

(54) APPARATUS FOR DETECTING CONTEXTUALLY-ANOMALOUS SENTENCE IN DOCUMENT, METHOD THEREFOR, AND COMPUTER-READABLE RECORDING MEDIUM HAVING PROGRAM FOR PERFORMING SAME METHOD RECORDED THEREON

(71) Applicant: ESTSOFT CORP., Seoul (KR)

(72) Inventors: Hyeong Jin Byeon, Seoul (KR); Min Gwan Seo, Seoul (KR); Hae Bin Shin, Seoul (KR)

(73) Assignee: ESTSOFT CORP., Seoul (KR)

( * ) Notice: Subject to any disclaimer, the term of this patent is extended or adjusted under 35 U.S.C. 154(b) by 47 days.

(21) Appl. No.: 17/413,825

(22) PCT Filed: Nov. 14, 2019

(86) PCT No.: PCT/KR2019/015553
§ 371 (c)(1),
(2) Date: Jun. 14, 2021

(87) PCT Pub. No.: WO2020/122440
PCT Pub. Date: Jun. 18, 2020

(65) Prior Publication Data
US 2022/0027608 A1     Jan. 27, 2022

(30) Foreign Application Priority Data

Dec. 14, 2018    (KR) .................. 10-2018-0162214

(51) Int. Cl.
*G06V 30/40*      (2022.01)
*G06F 40/289*     (2020.01)
(Continued)

(52) U.S. Cl.
CPC .............. *G06V 30/40* (2022.01); *G06F 18/22* (2023.01); *G06F 40/12* (2020.01); *G06F 40/289* (2020.01); *G06N 3/08* (2013.01); *G06V 10/768* (2022.01)

(58) Field of Classification Search
None
See application file for complete search history.

(56) References Cited

U.S. PATENT DOCUMENTS

| | | | |
|---|---|---|---|
| 2009/0067719 A1* | 3/2009 | Sridhar | G06F 40/289 |
| | | | 382/176 |
| 2012/0150534 A1* | 6/2012 | Sheehan | G06F 40/253 |
| | | | 704/E11.001 |

(Continued)

FOREIGN PATENT DOCUMENTS

| | | | | |
|---|---|---|---|---|
| KR | 10-2018-0092808 A | 8/2018 | | |
| WO | WO-2005045695 A1 * | 5/2005 | ........... | G06F 17/274 |

OTHER PUBLICATIONS

Bharucha et al. Detection of coherence-disrupting and coherence-conferring alterations in text. Memory & Cognition 1985, 13(6), 573-578. (Year: 1985).*

(Continued)

*Primary Examiner* — Amy M Levy
(74) *Attorney, Agent, or Firm* — NKL Law; Jae Youn Kim

(57) ABSTRACT

Disclosed are an apparatus and a method for detecting whether an anomalous sentence having a context different from that of other sentences exists in a document. The apparatus for detecting a contextually-anomalous sentence in a document according to the present invention includes: a sentence encoder for encoding individual sentences constituting document data by means of a predetermined rule (function) to generate encoding vectors; a context embedder neural network for converting the generated encoding vector (Continued)

into embedding vectors corresponding thereto; and a context anomaly detector neural network for detecting whether an anomalous sentence exists in the converted document data.

9 Claims, 3 Drawing Sheets

(51) Int. Cl.
  *G06F 40/12* (2020.01)
  *G06V 10/70* (2022.01)
  *G06N 3/08* (2023.01)
  *G06F 18/22* (2023.01)

(56) References Cited

U.S. PATENT DOCUMENTS

| | | | |
|---|---|---|---|
| 2013/0138665 A1* | 5/2013 | Hu | G06F 16/36 707/749 |
| 2016/0307566 A1 | 10/2016 | Bellegarda | |
| 2017/0132288 A1* | 5/2017 | Ho | G06F 40/30 |
| 2018/0204120 A1 | 7/2018 | Rei et al. | |
| 2020/0134016 A1* | 4/2020 | Cao | G06N 3/0472 |
| 2020/0285737 A1* | 9/2020 | Kraus | G06F 21/552 |
| 2020/0394364 A1* | 12/2020 | Venkateshwaran | G06F 40/137 |

OTHER PUBLICATIONS

Huang et al. Bidirectional LSTM-CRF Models for Sequence Tagging. arXiv: 1508.01991v1 [cs.CL] Aug. 9, 2015. Retrieved from [arXiv.com] on [May 13, 2022]. (Year: 2015).*

Roder et al. Exploring the Space of Topic Coherence Measures. WSDM'15, Feb. 2-6, 2015, Shanghai, China. http://dx.doi.org/10.1145/2684822.2685324. 10 pages. (Year: 2015).*

Cui et al. Text Coherence Analysis Based on Deep Neural Network. CIKM'17 , Nov. 6-10, 2017, Singapore, Singapore © 2017 Association for Computing Machinery. ACM ISBN 978-1-4503-4918-5/17/11. 4 pages. (Year: 2017).*

Logeswaran et al. Sentence Ordering and Coherence Modeling using Recurrent Neural Networks. Copyright © 2018, Association for the Advancement of Artificial Intelligence (www.aaai.org). arXiv:1611.02654v2 [cs.CL] Dec. 22, 2017. Retrieved from [arXiv.com] on [Sep. 22, 2022]. 8 pages. (Year: 2017).*

Tsunoo et al. Hierarchical Recurrent Neural Network for Story Segmentation. Interspeech 2017, Aug. 20-24, 2017, Stockholm, Sweden, http://dx.doi.org/10.21437/Interspeech.2017-392. 5 pages. (Year: 2017).*

McClure et al. Context is Key: New Approaches to Neural Coherence Modeling. Published at [arXiv:1812.04722v1 [cs.CL]] on [Dec. 6, 2018]. 7 pages. (Year: 2018).*

Nourbakhsh et al. A framework for anomaly detection using language modeling, and its applications to finance. Published at [arXiv:1908.09156v1 [cs.CL]] on [Aug. 24, 2019]. 5 pages. (Year: 2019).*

Seo et al., "FaGoN: Fake News Detection model using Grammatic Transformation on Neural Network", 2018 KICSS. , Nov. 15, 2018, pp. 4958-4970.

Lee et al., "Fake News Detection Using Deep Learning", Journal of Information Processing Systems, Oct. 2019, pp. 1119-1130, vol. 15, No. 5.

* cited by examiner

APPARATUS FOR DETECTING CONTEXTUALLY-ANOMALOUS SENTENCE IN DOCUMENT, METHOD THEREFOR, AND COMPUTER-READABLE RECORDING MEDIUM HAVING PROGRAM FOR PERFORMING SAME METHOD RECORDED THEREON

TECHNICAL FIELD

The present invention relates to an apparatus for detecting an anomalous sentence having a context different from that of other sentences in a given document, and a method for detecting an anomalous sentence having a context different from that of other sentences using the apparatus.

BACKGROUND ART

Attempts to perform learning contexts within a document using deep learning techniques have been published in academia. Among them, there are CoVe (McCann, Bryan, et al., NIPS 2017), ELMo (Peters, Matthew E., et al., arXiv 2018) and the like. All of these techniques use a recurrent neural network (RNN) as a method for learning the contexts in the document, and it may be referred to as a model which performs learning a sequential form for predicting the next sentence using a sequence of the previous sentence as the context. Accordingly, these models can calculate the probability that sequential inputs will appear, but cannot determine what sentences form one context, and whether the context changes in any sentence.

Meanwhile, a document is composed of unit sentences and paragraphs formed by a plurality of sentences, and a method, in which a portion having a context different from that of other portions (e.g., a plurality of sentences or a plurality of paragraphs formed by them) in a document is regarded as an anomaly, to detect the anomaly (i.e., an anomalous sentence) in the given document, is being developed. Herein, the contexts mean properties shared between arbitrary sentences, and the anomaly is detected using information indicating the contexts by assuming that the context information is included between a plurality of sentences constituting the given document. An existing anomaly detection technique uses the context information in the following two methods.

A first method is a method of extracting features necessary for classification of the context information. That is, this is a method of pre-processing a given document to assign metadata on which the context information is reflected, and detecting an anomaly by using the document and metadata together. In the pre-processing step used in this method, processing considering the context information (e.g., a dictionary reflection reflecting specific context information when extracting a noun, custom rule reflection, or the like) is performed, along with the processing used in typical language processing (e.g., part-of-speech tagging, noun extraction, or the like).

A second method is a method of explicitly classifying the context information. That is, this is a method of defining a category of the contexts to be processed in advance, classifying the contexts for each sentence from the input, and then detecting an anomaly using the same. For example, assuming that a given document is a news document, the context category is a category of news such as sports, politics, economics, and entertainments, etc., and if a sentence having a category different from that of other sentences in the document appears, the sentence is detected as the anomaly (i.e., the anomalous sentence).

However, the above-described anomaly detection techniques have the following problems. That is, in a case of assigning the metadata through pre-processing when using the context information, features added in the general language processing method provide additional information, but are insufficient to sufficiently reflect specific context information, as well as, in the case of the features added by processing method considering the context, additional costs are required for maintenance and repair of dictionary or custom rules, etc. In addition, even when explicitly classifying the contexts, it is difficult to create learning data for classifying a complex context in the document.

SUMMARY OF INVENTION

Problems to be Solved by Invention

In consideration of the above-mentioned circumstances, it is an object of the present invention to provide an apparatus capable of detecting an anomalous sentence having a context different from that of other sentences in a document by extracting context information which is properties shared between respective sentences from given document data through an artificial neural network, without extracting context information used to detect an anomaly in the document through a rule set in advance by a person, a method for the same, and a computer-readable recording medium in which a program for performing the method is recorded.

Means for Solving Problems

According to an aspect of the present invention, it may be implemented by an apparatus for detecting a contextually-anomalous sentence in a document, the apparatus including: a sentence encoder configured to, when document data is input, encode each of a plurality of sentences included in the document data to generate an encoding vector sequence including a plurality of encoding vectors; a context embedder neural network configured to convert the generated encoding vectors into a plurality of context embedding vectors corresponding to each of the plurality of encoding vectors included in the encoding vector sequence to generate an embedding vector sequence; a context anomaly detector neural network configured to calculate a result value indicating whether a contextually-anomalous sentence exists in the document data from the embedding vector sequence; a detector learning unit configured to, if the document data is learning data, cause the context anomaly detector neural network to perform learning so that a difference between the result value calculated by the context anomaly detector neural network and an expected value indicating whether an anomalous sentence exists in the learning data falls within a predetermined range; and a detection unit configured to, if the document data is suspected data, determine whether the anomalous sentence exists in the suspected data based on the result value calculated by the context anomaly detector neural network.

Herein, the apparatus according to the present invention may further include: a sentence sampling module configured to generate context learning data including pairs of encoding vectors corresponding to two or more sentences selected from the encoding vector sequence generated by the sentence encoder and a reference value indicating whether the contexts between the two or more sentences match with each other; a distance learning neural network configured to, when generating the pairs of encoding vectors included in the context learning data as pairs of embedding vectors corresponding thereto by the context embedder neural network, calculate a distance value between the pairs of embedding vectors; and an embedder learning unit configured to cause the context embedder neural network to perform learning so that a difference between the distance value between the pairs of embedding vectors calculated by the distance learning neural network and the reference value included in the context learning data falls within a predetermined range.

The reference value indicating whether the contexts between the two or more sentences match with each other may be set based on whether the two or more sentences are arranged adjacent to each other in the document data, whether the two or more sentences belong to the same paragraph in the document data, or whether the two or more sentences belong to the same category.

According to another aspect of the present invention, it may be implemented by a method for detecting a contextually-anomalous sentence in a document, the method including: a first step of, when document data is input, encoding, by a sentence encoder, each of a plurality of sentences included in the document data to generate an encoding vector sequence including a plurality of encoding vectors; a second step of converting, by a context embedder neural network, the generated encoding vectors into a plurality of context embedding vectors corresponding to each of the plurality of encoding vectors included in the encoding vector sequence to generate an embedding vector sequence; a third step of calculating, by a context anomaly detector neural network, a result value indicating whether a contextually-anomalous sentence exists in the document data from the embedding vector sequence; and a fourth step of, if the document data is suspected data, determining, by a detection unit, whether the anomalous sentence exists in the suspected data based on the result value calculated by the context anomaly detector neural network.

The above-described method may further include: before the fourth step, if the document data is learning data, causing, by a detector learning unit, the context anomaly detector neural network to perform learning so that the result value calculated by the context anomaly detector neural network has the same value as an expected value indicating whether an anomalous sentence exists in the learning data.

In addition, the method may further include: before the second step, generating, by a sentence sampling module, context learning data including pairs of encoding vectors corresponding to two or more sentences selected from the encoding vector sequence generated by the sentence encoder and a reference value indicating whether the contexts between the two or more sentences match with each other; when generating each of the pairs of encoding vectors included in the context learning data as pairs of embedding vectors corresponding thereto by the context embedder neural network, calculating, by a distance learning neural network, a distance value between the pairs of embedding vectors; and causing, by an embedder learning unit, the context embedder neural network to perform learning so that a difference between the distance value between the pairs of embedding vectors calculated by the distance learning neural network and the reference value included in the context learning data falls within a predetermined range.

The reference value indicating whether the contexts between the two or more sentences match with each other may be set based on whether the two or more sentences are arranged adjacent to each other in the document data, whether the two or more sentences belong to the same paragraph in the document data, or whether the two or more sentences belong to the same category, and in these cases, it may be determined that the contexts between the two or more sentences match with each other.

According to an aspect of the present invention, it may be implemented by a computer-readable recording medium in which a program for performing the above-described method for detecting a contextually-anomalous sentence in a document.

Advantageous Effects

According to the present invention, in extracting context information used to detect whether an anomalous sentence having a context different from that of other sentences in an input document exists, it may be configured to perform learning by a distance-based deep neural network model from the given data without extracting the context information through a predetermined rule unlike in the prior art. Through this, the context information which is difficult for a person to distinguish may be reflected when detecting an anomaly, and information for determining context may be directly extracted from data through the deep neural network. Therefore, when using the apparatus and method according to the present invention, the dictionary, custom rule, category classification, etc., which are conventionally used to reflect the context, are not required, such that maintenance and repair costs associated therewith may be reduced. In addition, since the present invention allows the anomalous sentence having a context different from that of other sentences within the input document to be detected, it may be effectively applied to various fields such as identifying whether the sentences provided by a chatter robot are appropriate, determining whether papers, etc., have been plagiarized, and detecting sentences that require correction in composition contents.

MODE FOR CARRYING OUT INVENTION

Figure 1:
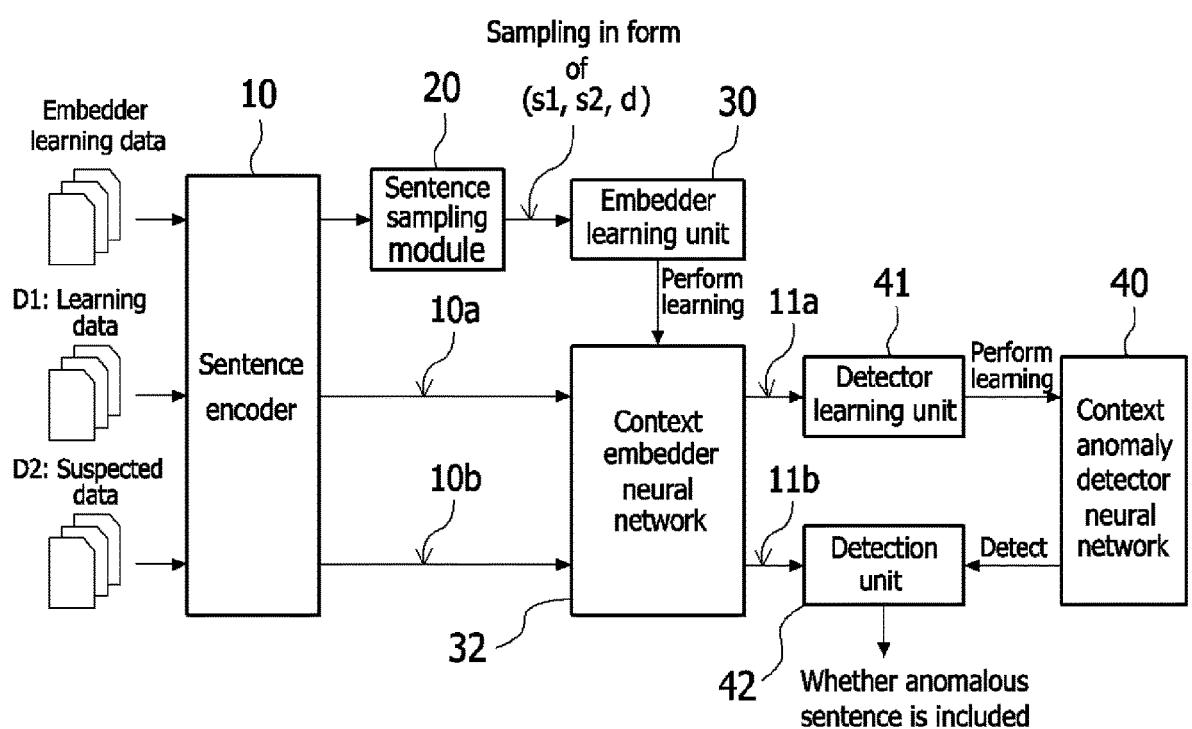
FIG. 1 is a block diagram illustrating an entire configuration of an apparatus for detecting an anomalous sentence having a context different from that of other sentences in a document ('apparatus for detecting a contextually-anomalous sentence in a document') according to an embodiment of the present invention.

According to an aspect of the present invention, it may be implemented by an apparatus for detecting a contextually-anomalous sentence in a document, the apparatus including: a sentence encoder configured to, when document data is input, encode each of a plurality of sentences included in the document data to generate an encoding vector sequence including a plurality of encoding vectors; a context embedder neural network configured to convert the generated encoding vectors into a plurality of context embedding vectors corresponding to each of the plurality of encoding vectors included in the encoding vector sequence to generate an embedding vector sequence; a context anomaly detector neural network configured to calculate a result value indicating whether a contextually-anomalous sentence exists in the document data from the embedding vector sequence;

a detector learning unit configured to, if the document data is learning data, cause the context anomaly detector neural network to perform learning so that a difference between the result value calculated by the context anomaly detector neural network and an expected value indicating whether an anomalous sentence exists in the learning data falls within a predetermined range; and a detection unit configured to, if the document data is suspected data, determine whether the anomalous sentence exists in the suspected data based on the result value calculated by the context anomaly detector neural network.

Herein, the apparatus according to the present invention may further include: a sentence sampling module configured to generate context learning data including pairs of encoding vectors corresponding to two or more sentences selected from the encoding vector sequence generated by the sentence encoder and a reference value indicating whether the contexts between the two or more sentences match with each other; a distance learning neural network configured to, when generating the pairs of encoding vectors included in the context learning data as pairs of embedding vectors corresponding thereto by the context embedder neural network, calculate a distance value between the pairs of embedding vectors; and an embedder learning unit configured to cause the context embedder neural network to perform learning so that a difference between the distance value between the pairs of embedding vectors calculated by the distance learning neural network and the reference value included in the context learning data falls within a predetermined range.

The reference value indicating whether the contexts between the two or more sentences match with each other may be set based on whether the two or more sentences are arranged adjacent to each other in the document data, whether the two or more sentences belong to the same paragraph in the document data, or whether the two or more sentences belong to the same category.

According to another aspect of the present invention, it may be implemented by a method for detecting a contextually-anomalous sentence in a document, the method including: a first step of, when document data is input, encoding, by a sentence encoder, each of a plurality of sentences included in the document data to generate an encoding vector sequence including a plurality of encoding vectors; a second step of converting, by a context embedder neural network, the generated encoding vectors into a plurality of context embedding vectors corresponding to each of the plurality of encoding vectors included in the encoding vector sequence to generate an embedding vector sequence; a third step of calculating, by a context anomaly detector neural network, a result value indicating whether a contextually-anomalous sentence exists in the document data from the embedding vector sequence; and a fourth step of, if the document data is suspected data, determining, by a detection unit, whether the anomalous sentence exists in the suspected data based on the result value calculated by the context anomaly detector neural network.

The above-described method may further include: before the fourth step, if the document data is learning data, causing, by a detector learning unit, the context anomaly detector neural network to perform learning so that the result value calculated by the context anomaly detector neural network has the same value as an expected value indicating whether an anomalous sentence exists in the learning data.

In addition, the method may further include: before the second step, generating, by a sentence sampling module, context learning data including pairs of encoding vectors corresponding to two or more sentences selected from the encoding vector sequence generated by the sentence encoder and a reference value indicating whether the contexts between the two or more sentences match with each other; when generating each of the pairs of encoding vectors included in the context learning data as pairs of embedding vectors corresponding thereto by the context embedder neural network, calculating, by a distance learning neural network, a distance value between the pairs of embedding vectors; and causing, by an embedder learning unit, the context embedder neural network to perform learning so that a difference between the distance value between the pairs of embedding vectors calculated by the distance learning neural network and the reference value included in the context learning data falls within a predetermined range.

The reference value indicating whether the contexts between the two or more sentences match with each other may be set based on whether the two or more sentences are arranged adjacent to each other in the document data, whether the two or more sentences belong to the same paragraph in the document data, or whether the two or more sentences belong to the same category, and in these cases, it may be determined that the contexts between the two or more sentences match with each other.

According to an aspect of the present invention, it may be implemented by a computer-readable recording medium in which a program for performing the above-described method for detecting a contextually-anomalous sentence in a document.

Terms or words used herein should not be construed as limited to a conventional or lexical meaning, and should be understood as appropriate notions by the inventor based on that he/she is able to define terms to describe his/her invention in the best way to be seen by others. Therefore, embodiments described herein and configurations illustrated in the drawings are the most preferable embodiment of the present invention and not exhaustive in terms of the technical idea of the present invention, and it will be understood that various modifications and equivalents may be made to take the place of the embodiments at the application point of the present invention.

Hereinafter, preferred embodiments of the present invention will be described in detail with reference to the accompanying drawings. Herein, it should be noted that the same components are denoted by the same reference numerals in the accompanying drawings. In addition, detailed descriptions of well-known functions and configurations that may make the subject matter of the present invention rather unclear will not be described. For the same reason, in the accompanying drawings, some components are exaggerated, omitted, or schematically illustrated, and the size of each component does not entirely reflect the actual size.

Figure 2:
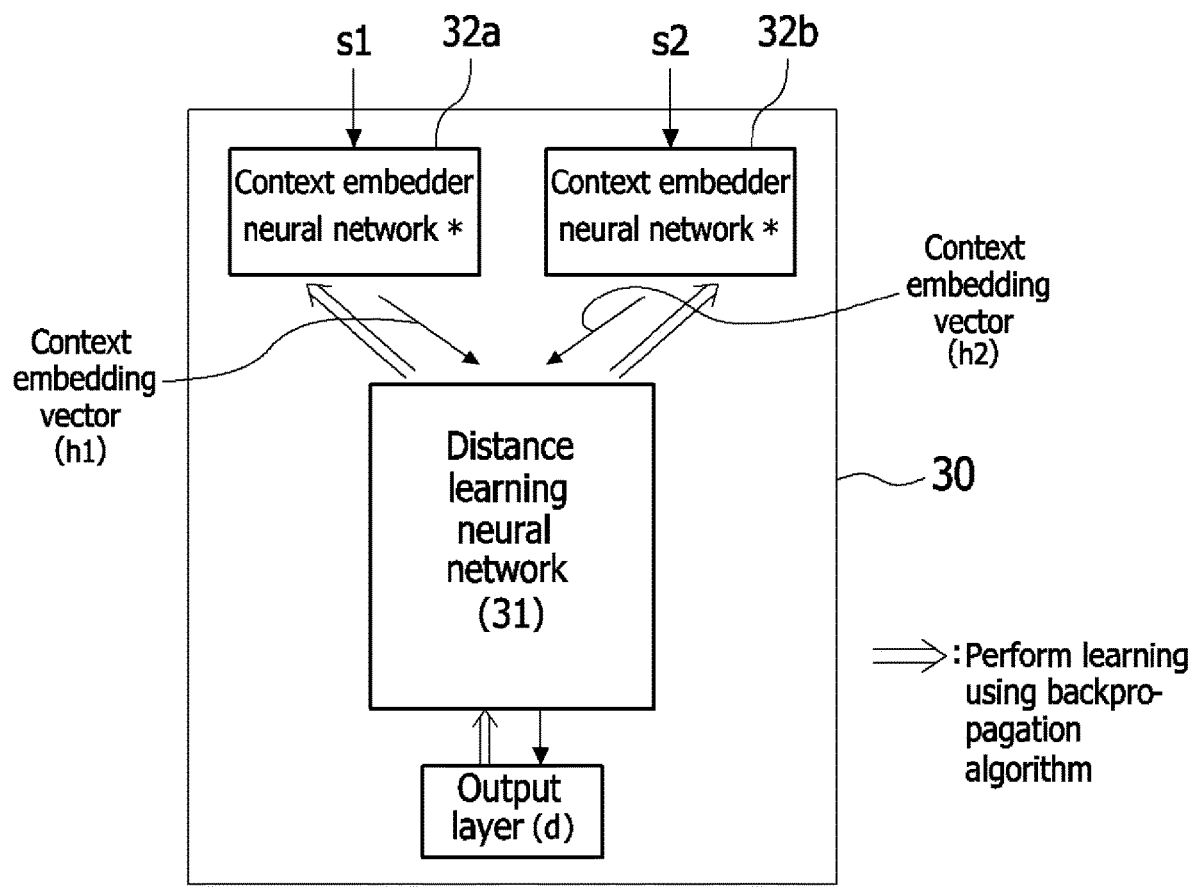
FIG. 2 is a block diagram illustrating a configuration of an embedder learning unit for causing a context embedder neural network to perform learning.
Figure 3:
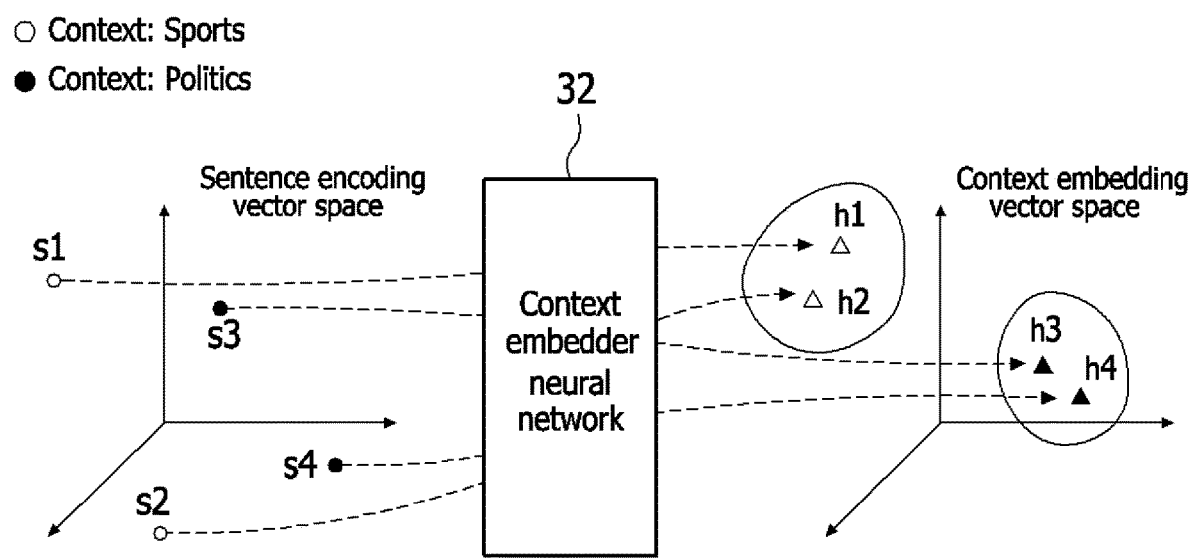
FIG. 3 is a diagram describing an example of a relationship between encoding vectors converted corresponding to sentences included in document data and embedding vectors using a vector space.

FIG. 1 is a block diagram illustrating an entire configuration of an apparatus for detecting a contextually-anomalous sentence in a document according to an embodiment of the present invention, FIG. 2 is a block diagram illustrating a configuration of an embedder learning unit for causing a context embedder neural network to perform learning, and FIG. 3 is a diagram describing an example of a relationship between encoding vectors converted corresponding to sentences included in document data and embedding vectors generated by the context embedder neural network. Hereinafter, the apparatus for detecting a contextually-anomalous sentence in a document according to the present invention and a method for detecting a contextually-anomalous sentence in a document using the same will be described in detail with reference to FIGS. 1 to 3.

The apparatus for detecting a contextually-anomalous sentence in a document according to the present invention includes a sentence encoder 10 configured to encode individual sentences constituting document data according to a predetermined rule (function) to generate encoding vectors, a context embedder neural network 32 configured to convert the generated encoding vectors into embedding vectors corresponding thereto, and a context anomaly detector neural network 40 configured to detect whether an anomalous sentence exists in document data converted into a series of embedding vector sequences. In addition to the above components, the apparatus according to the present invention may include an embedder learning unit 30 configured to cause the context embedder neural network 32 to perform learning, a detector learning unit 41 configured to cause the context anomaly detector neural network 40 to perform learning, and a detection unit 42 configured to determine whether the anomalous sentence exists in the document data based on a result value calculated by the context anomaly detector neural network 40.

When arbitrary document data is input, the sentence encoder 10 encodes each of a plurality of sentences included in the document data and converts it into a plurality of encoding vectors corresponding thereto.

The encoding vector is a value converted into a vector for each sentence, and refers to numerical data encoded according to a predetermined rule. Therefore, when the document data is input to the sentence encoder 10, individual sentences constituting the document data are converted into encoding vectors corresponding thereto, such that the document data including the plurality of sentences may be converted into an encoding vector sequence which is a set of encoding vectors corresponding to each of the sentences.

The converted encoding vector sequence as described above is converted into an embedding vector sequence by the context embedder neural network 32. Herein, the embedding vector sequence refers to a set of embedding vectors formed by converting each of encoding vectors included in the encoding vector sequence into context embedding vectors corresponding thereto. The context embedder neural network 32 uses a neural network which is subjected to learning in advance by the embedder learning unit 30.

That is, the context embedder neural network 32 performs learning by using the input encoding vector by converting it into the embedding vector according to the predetermined rule (i.e., the function). A learning method of the context embedder neural network 32 will be described with reference to FIG. 2 as follows.

When embedder learning data (i.e., document data) is input, the sentence encoder 10 generates an encoding vector sequence in the above-described manner. Such the generated encoding vector sequence includes a plurality of encoding vectors, and a sentence sampling module 20 generates context learning data by extracting two encoding vectors from the encoding vector sequence. Herein, the context learning data includes extracted two encoding vectors s1 and s2, as well as a reference value d indicating whether the contexts match with each other between two sentences corresponding thereto.

The context learning data may be formed in a form of (s1, s2, and d), for example. Herein, s1 and s2 refer to the two encoding vectors selected by the sentence sampling module 20. In addition, the reference value d is a value indicating a distance between two sentences, and is determined according to the context within the learning data (i.e., document) to be learned.

More specifically, the context refers to a "property in which one sentence is shared among other sentences." The context may be set in various ways. For example, when regarding sentences adjacent to each other in a document as the same context, the reference value d indicating whether the contexts match with each other may be determined as in [Equation 1] below.

$$d = \begin{cases} 0 \text{ if adjacent } (s1, s2) \\ 1 \text{ otherwise} \end{cases} \quad \text{[Equation 1]}$$

Wherein, adjacent (s1 and s2) is a function that returns whether two sentences are adjacent to each other when the encoding vectors of two sentences are input. That is, the sentence sampling module 20 generates the reference value for an adjacent distance between the extracted encoding vectors together, while extracting arbitrary encoding vectors from an encoding vector sequence s1, s2, ... and sN generated by the sentence encoder 10. For example, when extracting encoding vectors s1 and s2 corresponding to two sentences adjacent to each other, if s1 and s2 are encoding vectors corresponding to the sentences adjacent to each other, the reference value d is set to be "0," and otherwise, the reference value d is set to be "1."

As another example, when regarding the context as a paragraph of a document (i.e., when regarding a sentence included in the same paragraph as the same context), the reference value d may be set by using paragraph (s), a function that returns a paragraph value of the sentence by receiving the encoding vector, as represented in [Equation 2] below. That is, when two sentences corresponding to s1 and s2 belong to the same paragraph, the reference value d is set to be "0," and conversely, when they belong to different paragraphs, the reference value d is set to be "1."

$$d = \begin{cases} 0 \text{ if paragraph } (s1) = \text{paragraph } (s2) \\ 1 \text{ otherwize} \end{cases} \quad \text{[Equation 2]}$$

In addition, when regarding the context as a category of the document (i.e., when regarding the sentence of the same category as the same context), the reference value d may be set by using category (s), a function that returns the category value of the sentence by receiving the encoding vector, as represented in [Equation 3] below. For example, when s1 and s2 are encoding vectors corresponding to the sentences extracted from the embedder learning data which are news articles about "sports," the reference value d is set to be "0." Conversely, when s1 is an encoding vector corresponding to a sentence extracted from a news article about "sports" and s2 is an encoding vector corresponding to a sentence extracted from a news article about "politics," the reference value d may be set to be "1."

$$d = \begin{cases} 0 \text{ if category } (s1) = \text{category } (s2) \\ 1 \text{ otherwise} \end{cases} \quad \text{[Equation 3]}$$

Next, the embedder learning unit 30 causes the context embedder neural network (i.e., a neural network that converts an encoding vector into an embedding vector) and a distance learning neural network 31 to perform learning. For example, as shown in FIG. 2, a pair of encoding vectors s1 and s2 included in the context learning data are converted into a pair of embedding vectors h1 and h2 by the first context embedder neural network 32a and the second context embedder neural network 32b, respectively. Herein, each of the first and second context embedder neural networks 32a and 32b used to generate the embedding vector includes a plurality of layers that perform a plurality of calculations, and at least one layer among the plurality of layers performing the calculations includes a weight W to be used in the calculation of each step. As the first and second context embedder neural networks 32a and 32b used to generate the embedding vector, a fully-connected neural network, a convolutional neural network, a recurrent neural network, and the like may be used. In addition, although the first and second context embedder neural networks 32a and 32b are separately illustrated for convenience of description, they are formed in substantially the same neural network as each other. Further, after the context embedder neural networks 32a and 32b subjected to learning by the embedder learning unit 30 are finally learned, they are used as the above-described context embedder neural network 32.

Meanwhile, the distance learning neural network 31 receives the pair of embedding vectors h1 and h2 as an input and calculates a distance value between the pair of embedding vectors h1 and h2. The distance learning neural network 31 also includes a plurality of layers that perform a plurality of calculations, and at least one layer among the plurality of layers performing the calculations includes a weight to be used in the calculation of each step.

As the distance learning neural network 31, the fully-connected neural network, the convolutional neural network, the recurrent neural network, and the like may be used.

The embedder learning unit 30 causes the context embedder neural networks 32a and 32b and the distance learning neural network 31 to perform learning using a backpropagation algorithm. For example, with respect to the pairs of embedding vectors generated by the context embedder neural networks 32a and 32b, the distance value of an output layer calculated by the distance learning neural network 31 is compared with the reference value d included in the context learning data to calculate the weight W so as to minimize a difference between both values. The process of calculating the weight W until the difference between the distance value of the output layer and the set reference value falls within a predetermined range is referred to as learning.

The context embedder neural network 32 finally subjected to learning by the embedder learning unit 30 generates embedding vectors in such a manner that embedding vectors for sentences whose contexts are the same as each other have a relatively short distance so that they are adjacent to each other on a context embedding vector space, and on the other hand, generates embedding vectors in such a manner that embedding vectors for sentences whose contexts are different from each other have a relatively long distance so that they are far away from each other on the context embedding vector space. That is, as shown in FIG. 3, when pairs of encoding vectors s1, s2, s3, and s4 corresponding to four sentences are generated as pairs of embedding vectors h1, h2, h3 and h4 by the context embedder neural network 32, embedding vectors corresponding to the encoding vectors whose contexts are the same as each other will have a short distance so that they are adjacent to each other in the context embedding vector space. For example, when performing learning by regarding the context as a category of document, the embedding vectors h1 and h2 corresponding to the encoding vectors s1 and s2 whose contexts are 'sports' have a short distance so that they are adjacent to each other on the vector space, and the embedding vectors h3 and h4 corresponding to the encoding vectors s3 and s4 whose contexts are 'politics' also have a short distance so that they are adjacent to each other on the vector space. On the other hand, the embedding vector h1 corresponding to the encoding vector s1 whose context is 'sports' and the embedding vector h3 corresponding to the encoding vector s3 whose context is 'politics' have a relatively long distance so that they are far away from each other on the vector space. In other words, when an encoding vector for an arbitrary sentence is input, the context embedder neural network 32 generates embedding vectors so that sentences whose contexts are the same as each other are adjacent to each other on the vector space, and on the other hand, generates embedding vectors so that sentences whose contexts are different from each other are relatively far away from each other on the vector space.

The above-described embedder learning unit 30 is also capable of simultaneously performing learning on two or more sentences. In addition, it may be configured so that the context learning data includes pairs of encoding vectors having the same reference value d such as "((s1, s2, 0), (s2, s3, 1))" and pairs of encoding vectors having different reference values d. As such, it is also possible for the embedder learning unit 30 to simultaneously perform learning on a plurality of pairs of encoding vector.

Again returning to FIG. 1, by using the embedding vector sequence generated by the context embedder neural network 32 subjected to learning as described above, the context anomaly detector neural network 40 performs learning so as to calculate a result value indicating whether a contextually-anomalous sentence exists in the input document data. As the context anomaly detector neural network 40, the fully-connected neural network, the convolutional neural network, the recurrent neural network, and the like may be used.

An encoding vector sequence 10a "s1, s2, . . . and sN" generated by inputting learning data D1 into the sentence encoder 10 is converted into an embedding vector sequence 11a "h1, h2, . . . and hN" by the context embedder neural network 32. The detector learning unit 41 inputs the embedding vector sequence 11a for the learning data D1 into the context anomaly detector neural network 40, thereby causing the neural network 40 to perform learning so that the result value calculated by this network has the same value as an expected value y indicating whether the anomalous sentence exists in the learning data D1.

For example, as the learning data D1, a 'document which does not include the anomalous sentence' (i.e., a 'normal document') or a 'document which includes the anomalous sentence' (i.e., an 'anomalous document') may be used. As an example, when causing the context embedder neural network 32 to perform learning by defining the context as a paragraph of a document, an encoding vector sequence s1, s2, . . . , s11, s12, . . . and sN of a document with a well-written context, which is generated by the sentence encoder 10 using the learning data D1, may be used as an encoding vector sequence for the 'normal document.' On the other hand, the encoding vector sequence s1, s12, . . . , s11, s2, . . . and sN of a document having different paragraphs in which s2 and s12 are inverted may be used as an encoding vector sequence for the 'anomalous document.' In this case, h12 of the embedding vector sequence h1, h12, ..., h11, h2, ... and hN for the 'anomalous document,' which are generated by the context embedder neural network 32, is generated as a vector which is relatively distant from other embedding vectors h1, and h3 to h10 belonging to the same paragraph on the vector space.

The detector learning unit 41 sets an expected value of an embedding vector sequence h1, h2, ..., h11, h12, ... and hN for the 'normal document' to be '0,' and sets an expected value of an embedding vector sequence h1, h12, ..., h11, h2, ... and hN for the 'anomalous document' to be '1,' thereby causing the context anomaly detector neural network 40 to perform learning in such a way that a weight is calculated using the backpropagation algorithm so that a difference between the result value y which is calculated by inputting different embedding vector sequences into the context anomaly detector neural network 40, and the expected value indicating whether an anomalous sentence exists is minimized, and the calculated weight is applied to each layer that performs the plurality of calculations. The context anomaly detector neural network 40 is subjected to learning so that the difference between the result value and the expected value falls within a predetermined range, thereby outputting a result value y close to the expected value "0" for the embedding vector sequence for the normal document which does not include the anomalous sentence, and on the other hand, outputting a result value y close to the expected value "1" for the embedding vector sequence for the anomalous document which includes the anomalous sentence. Using the context anomaly detector neural network 40 subjected to learning as described above, it is determined whether the anomalous sentence exists in the document data.

That is, it is possible to determine whether an anomalous sentence exists in suspected data D2 by using the context embedder neural network 32 and context anomaly detector neural network 40, on which learning is finally well preformed. For example, by inputting the suspected data D2 to generate an encoding vector sequence 10*b* by the sentence encoder 10, converting the generated embedding vector sequence 10*b* into an encoding vector sequence 11*b* by the context embedder neural network 32, and then calculating a result value y indicating whether a contextually-anomalous sentence exists in the suspected data D2 from the embedding vector sequence 11*b* by the context anomaly detector neural network 40, followed by determining whether an anomalous sentence exists in the suspected data D2 based on the calculated result value y by the detection unit 42.

The above-described apparatus for detecting a contextually-anomalous sentence in a document and a detection method using the same may be used for various applications. For example, since fake news created by modifying or adding the contents of an original article includes anomalous sentences that do not match with the existing thread (i.e., context), the inventive apparatus and method may be used to determine the fake news among the collected news articles. In addition, in the case of chatter robots, it is important to create sentences that match with the context of the current conversation, and in this regard, the inventive apparatus and method may also be used to check whether the sentences provided by a chatter robot algorithm match with the current context or detect whether the context of the conversation changes. Furthermore, the inventive apparatus and method may be used to detect whether plagiarism of a paper or the like is present. For example, if inserting a sentence written by a person into a sentence written by another person, the content of the plagiarized sentence will have a context different from that of other surrounding sentences, such that the paper containing an anomalous sentence may be regarded as a plagiarized paper. In addition, sentences that do not match with the flow of the context in an essay, writing, etc. may be detected as the anomalous sentences, and the sentences may be corrected or paragraphs may be automatically distinguished according to the context.

Meanwhile, the above-described method for detecting a contextually-anomalous sentence in a document according to the embodiment of the present invention may be implemented in a program command form which may be performed through various means for processing information to be recorded in a storage medium. Herein, the storage medium may include program commands, data files, data structures, and the like alone or in combination thereof. The program command recorded in the storage medium may be specially designed and configured for the present invention, or may be publicly known to and used by those skilled in the software field. Examples of the storage medium include magnetic media such as a hard disk, a floppy disk, and a magnetic tape, optical media such as a CD-ROM and a DVD, magneto-optical media such as a floptical disk, and a hardware apparatus which is specifically configured to store and examples of the program command such as a ROM, a RAM, a flash memory and the like. An example of the program command includes a high-level language code executable by an apparatus electrically processing information, for example, a computer by using an interpreter, and the like, as well as a machine language code generated by a compiler. The hardware apparatus may be configured to be operated with one or more software modules in order to perform the operation of the present invention, and an opposite situation thereof is available.

While the present invention has been described with reference to several preferred embodiments, the present invention is not limited to the above-described exemplary embodiments, and it will be understood by those skilled in the art that various modifications and variations may be made within the detailed description of the invention and accompanying drawings without departing from the scope of the present invention as defined by the appended claims, as well as these modifications and variations should be included in the scope of the present invention according to doctrine of equivalents.

The invention claimed is:

1. An apparatus for detecting a contextually-anomalous sentence in a document, the apparatus comprising a processor and one or more memory devices communicatively coupled to the processor, and the one or more memory devices store instructions operable when executed by the processor to perform:

when document data is input, encoding each of a plurality of sentences included in the document data to generate an encoding vector sequence including a plurality of encoding vectors, wherein each sentence has a context;

when the document data is learning data, performing learning by a context anomaly detector neural network by:

generating context learning data including pairs of encoding vectors corresponding to two or more sentences selected from the encoding vector sequence and a reference value indicating whether the contexts between the two or more sentences match with each other;

causing a context embedder neural network to convert the generated encoding vector sequence into a first plurality of context embedding vectors corresponding to each of the plurality of encoding vectors included in the generated encoding vector sequence to generate a first embedding vector sequence based on the context learning data;

causing a distance learning neural network to, when converting the pairs of encoding vectors included in the context learning data as pairs of embedding vectors corresponding thereto by the context embedder neural network, calculate a distance value between the pairs of embedding vectors, wherein the distance learning neural network receives the pair of embedding vectors as an input and calculates the distance value;

causing the context embedder neural network to perform learning so that a difference between the distance value between the pairs of embedding vectors calculated by the distance learning neural network and the reference value included in the context learning data falls within a first predetermined range;

causing the context anomaly detector neural network to calculate a learning result value indicating whether a learning contextually-anomalous sentence exists in the document data from the first embedding vector sequence; and causing the context anomaly detector neural network to perform learning so that a difference between the learning result value calculated by the context anomaly detector neural network and an expected value indicating whether the learning contextually-anomalous sentence exists in the learning data falls within a second predetermined range; and when the document data is suspected data;

causing the context embedder neural network to convert the generated encoding vector sequence into a second plurality of context embedding vectors corresponding to each of the plurality of encoding vectors included in the encoding vector sequence to generate a second embedding vector sequence;

causing the context anomaly detector neural network to calculate a result value indicating whether a contextually-anomalous sentence exists in the document data from the second embedding vector sequence; and determining whether the contextually-anomalous sentence exists in the suspected data based on the result value calculated by the context anomaly detector neural network;

wherein the processor further:

causes the distance learning neural network to perform repeated learnings, together with the context embedder neural network, by calculating a weight until the difference between the distance value and the reference value falls within the first predetermined range; and causes the context embedder neural network, after performing the repeated learnings, to convert the encoding vectors into the first plurality of context embedding vectors reflecting the distance value in a context embedding vector space.

2. The apparatus according to claim 1, wherein the reference value indicating whether the contexts between the two or more sentences match with each other is set based on whether the two or more sentences are arranged adjacent to each other in the document data.

3. The apparatus according to claim 1, wherein the reference value indicating whether the contexts between the two or more sentences match with each other is set based on whether the two or more sentences belong to the same paragraph in the document data.

4. The apparatus according to claim 1, wherein the reference value indicating whether the contexts between the two or more sentences match with each other is set based on whether the two or more sentences belong to the same category.

5. A method for detecting a contextually-anomalous sentence in a document, the method comprising:

when document data is input, encoding, by a sentence encoder, each of a plurality of sentences included in the document data to generate an encoding vector sequence including a plurality of encoding vectors, wherein each sentence has a context;

when the document data is learning data, performing learning by a context anomaly detector neural network by:

generating context learning data including pairs of encoding vectors corresponding to two or more sentences selected from the encoding vector sequence and a reference value indicating whether the contexts between the two or more sentences match with each other;

converting, by a context embedder neural network, the generated encoding vector sequence into a first plurality of context embedding vectors corresponding to each of the plurality of encoding vectors included in the generated encoding vector sequence to generate a first embedding vector sequence based on the context learning data;

when converting each of the pairs of encoding vectors included in the context learning data as pairs of embedding vectors corresponding thereto by the context embedder neural network, calculating, by a distance learning neural network, a distance value between the pairs of embedding vectors, wherein the distance learning neural network receives the pair of embedding vectors as an input and calculates the distance value;

causing the context embedder neural network to perform learning so that a difference between the distance value between the pairs of embedding vectors calculated by the distance learning neural network and the reference value included in the context learning data falls within a first predetermined range;

calculating, by a context anomaly detector neural network, a learning result value indicating whether a learning contextually-anomalous sentence exists in the document data from the embedding vector sequence; and causing the context anomaly detector neural network to perform learning so that a difference between the learning result value calculated by the context anomaly detector neural network and an expected value indicating whether the learning contextually-anomalous sentence exists in the learning data falls within a second predetermined range; and when the document data is suspected data;

causing the context embedder neural network to convert the generated encoding vector sequence into a second plurality of context embedding vectors corresponding to each of the plurality of encoding vectors included in the encoding vector sequence to generate a second embedding vector sequence;

causing the context anomaly detector neural network to calculate a result value indicating whether a contextually-anomalous sentence exists in the document data from the second embedding vector sequence; and determining, by a detection unit, whether the contextually-anomalous sentence exists in the suspected data based on the result value calculated by the context anomaly detector neural network;

wherein:

the distance learning neural network performs repeated learnings, together with the context embedder neural network, by calculating a weight until the difference between the distance value and the reference value falls within the first predetermined range; and the context embedder neural network, after performing the repeated learnings, converts the encoding vectors into the first plurality of context embedding vectors reflecting the distance value in a context embedding vector space.

6. The method according to claim 5, wherein the reference value indicating whether the contexts between the two or more sentences match with each other is set based on whether the two or more sentences are arranged adjacent to each other in the document data.

7. The method according to claim 5, wherein the reference value indicating whether the contexts between the two or more sentences match with each other is set based on whether the two or more sentences belong to the same paragraph in the document data.

8. The method according to claim 5, wherein the reference value indicating whether the contexts between the two or more sentences match with each other is set based on whether the two or more sentences belong to the same category.

9. A non-transitory computer-readable recording medium in which a program for performing the method for detecting a contextually-anomalous sentence in a document according to claim 5 is recorded.

* * * * *